Figure 1:
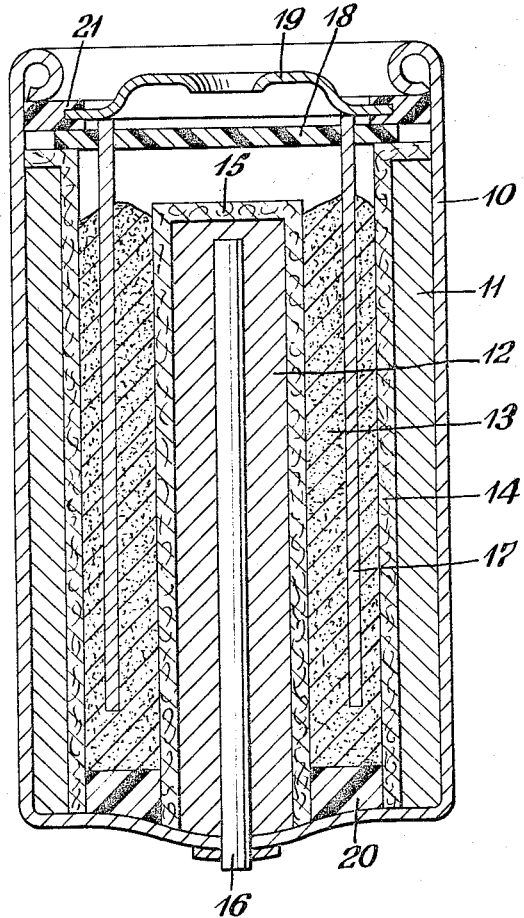

Aug. 8, 1967  K. V. KORDESCH  3,335,031
GALVANIC CELL
Filed March 9, 1966

INVENTOR.
KARL V. KORDESCH
BY John H. Hohmann
ATTORNEY

3,335,031
GALVANIC CELL
Karl V. Kordesch, Lakewood, Ohio, assignor to Union Carbide Corporation, a corporation of New York
Filed Mar. 9, 1966, Ser. No. 536,555
7 Claims. (Cl. 136—6)

This application is a continuation-in-part of my co-pending patent application United States patent application Ser. No. 195,104, filed May 16, 1962, now abandoned.

This invention relates to round galvanic cells, and more particularly, this invention relates to improvements in cylindrical alkaline-type cells, such as primary and secondary cells of the alkaline-manganese dioxide-zinc system.

In the conventional cylindrical alkaline cell the cathode, usually manganese dioxide, envelops as a thin sleeve a central particulate anode, usually zinc. Such an arrangement results in a limited utilization of the anode material contained in the cell during the discharge, particularly at high current drains. Moreover, in a cell construction of such type, the complete consumption of the cathode often occurs which condition prevents recharging of the cell. Another difficulty is that when the cell is recharged the anode is replated unevenly thus decreasing the efficiency and effectiveness of the cell during subsequent use.

Such conventional cell constructions are generally known as "inside-out" batteries since the cathode is of annular-shape (also cup-shaped) and is disposed adjacent a steel can which serves as the cathode current collector. One such exemplary design is disclosed in the Marsal et al. United States Patent No. 2,960,558. Because of the difficulty and expense of rendering the cathodic element leakproof and of its lack of sufficient strength to permit its use as an unsupported container, the steel can is employed to remedy these problems and to serve as the cathode current collector. A recent improved primary battery, United States Patent No. 2,903,499, combines the advantages of inside-out cells with those of the conventional cells. This primary battery differs from the above noted cells in that a double "cathode current collector" is employed by means of an "outer" carbon cup forming a first cathode current collector, and an "inner" carbon rod projecting from the base of the cup forming a second cathode current collector. This type of cell structure is reported to be leakproof and generally characterized by maximized effective anode and cathode area and by more uniform utilization of anode and cathode active material. In this connection, the active cathode depolarizer (manganese dioxide) is interposed as a separate element between a centralized annular zinc anode and the two carbon "cathode current collectors."

The present invention provides a further improvement wherein both the inner and outer elements are composed of active cathode material, i.e., suitably a mixture of manganese dioxide and carbon. This double cathode cell construction provides much more effective use of internal cell space for the same size cell than does the cell structure exemplified by U.S. Patent No. 2,903,499 by utilizing active cathode materials in those areas where said patent teaches only cathode current collector bodies entirely composed of carbon alone.

Accordingly, it is a primary object of this invention to provide a cylindrical cell having a longer life and enhanced performance characteristics, and one in which the cathode and anode materials are utilized more efficiently.

It is another object of this invention to provide cell having decreased internal resistance, and one in which the anode material is more nearly uniformly replated upon recharging.

It is a further object of the invention to maximize the effective anode area of a given size round cell.

A still further object of the invention in addition to each and every of the foregoing objects is the provision of a cylindrical cell in which substantially uniform utilization of the depolarizer material takes place and in which the utilization of the depolarizer is maximized.

These and other related objects are achieved by the present invention which comprises a cylindrical cell in which a central cathode element is electrically connected to and situated in a spaced relationship with an outer cathode element, thereby defining a space between the cathode elements, and a high surface area anode admixed with or wetted by a suitable electrolyte disposed in the space between the cathode elements. In this particular arrangement the anode element is utilized from both sides. Moreover, during recharge the cathode structure of the cell permits the anode material to be plated out from both sides. This assures a more uniform distribution of the anode material for the subsequent discharge.

Figure 2:
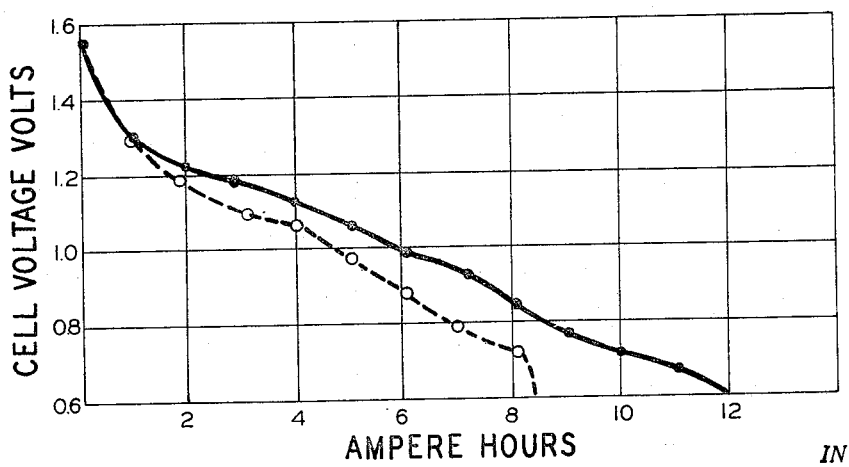

In the drawing,
FIG. 1 is a sectional view of the cell, and
FIG. 2 is a graphical presentation of the improved discharge characteristics of the cell of this invention.

In the drawing, and particularly in FIG. 1, there is suitably shown a cylindrical cell embodying the instant invention. The cell comprises a casing 10 enveloping the active components of the cell and also electrically connecting an outer cathode element 11 with an inner central cathode element 12. This condition may suitably be achieved by utilizing an electrically conductive casing in electrical contact with both outer and inner cathode elements, by extruding both cathode elements in place integrally in one operation, or by spot-welding the inner cathode element 12 to the casing 10 in a suitable manner. In the event the casing is made of a non-conductive material and the cathode elements are not integrally formed a specific connector such as a metal braid or strip must be employed to electrically connect the two cathodes. A high surface area anode element 13 is contained in the space defined by the two cathodes and is separated from the cathode elements 11 and 12 by electrolyte-permeable barriers 14 and 15. Suitable barriers may be made from regenerated cellulose or other materials conventionally used in the art. The central cathode element 12 may be provided with a suitable cathode collector, such as metallic conductor 16, longitudinally disposed with respect to the cathode element and secured to the bottom of the casing 10 to provide a terminal for the cell. Similarly, suitable conducting means such as anode collector 17 is longitudinally disposed with respect to the anode element 13 and is shown herein extending through suitable venting means, such as the gas-permeable membrane 18. The main purpose of this membrane is to retain the anode and the electrolyte while preventing gas buildup within the cell during recharging. This membrane may be omitted and other suitable gas venting means may be used. The anode collector 17 may be a single metal strip, a series of strips electrically connected to each other, or it may be a metal tube or wire extending into the anode. A typical anode terminal is shown in FIG. 1 in the form of a terminal plate 19 electrically connected to the anode collector 17. Since the casing 10 shown in FIG. 1 is metallic and is employed also as the electrical connector between the outer and central cathode elements, it must be insulated from the anode element 13 so as to prevent an internal short circuit. Such insulation is achieved by suitable insulating means such as washer 20. Another insulating washer 21 serves to prevent electrical contact between the terminal plate 19 and the casing 10.

The cathode elements employed comprise predominantly oxidic depolarizers. Common materials for this purpose are manganese dioxide, mercuric oxide, silver oxide, copper oxide, vanadium pentoxide, nickel oxide, and the like. These materials are usually admixed with binders and conductive materials such as graphite, steel wool and the like, and the resulting mixture shaped to the desired form. In the instant invention the preferred cathode elements comprise manganese dioxide bonded with an alkaline-resistant cement and containing filamentary binders, such as steel wool, dispersed throughout.

Any of several bonding techniques may be employed in the construction of the cathode elements. The cement-and-steel wool binder described above is very satisfactory. Another technique employs a cement-and-latex binder. This technique is particularly suitable where large dimensional changes of the cathode elements are expected during charging. Still another technique involves the use of a plastic binder such as polyvinyl chloride, in combination with steel wool. The plastic material and the steel wool or other filamentary material are mixed with the depolarizer and compacted under sufficient heat and pressure to soften and mold the plastic material. Less than about five parts of the plastic material are required per 100 parts of depolarizer. About three parts per 100 parts of depolarizer are preferred. The amount of steel wool usually ranges between 1 and 20 percent by weight of the cathode element.

A consumable anodic material such as zinc metal, for example, is employed for the preparation of a particulate anode element. Examples of useful anode elements may be made by admixing zinc particles with an aqueous carboxymethyl cellulose solution so as to form a viscous gel. The gel is then extruded into small, thin rods which are dried and subsequently crushed to the desired particle size. Alternately, the gelled mass may be admixed with a suitable alkaline electrolyte such as aqueous potassium hydroxide solution, for example, and used as the anode element. Suitable anode materials and the preparation thereof, are fully described in U.S. Patent 2,938,064, issued on May 24, 1960 to K. Kordesch, U.S. Patent 2,935,547, issued on May 3, 1960 to K. Kordesch and U.S. Patent 2,933,947, issued on July 25, 1961 to E. E. Leger. If the extruded, dried, and crushed granular anode is employed, a suitable electrolyte must be added, of course, prior to use. In either instance, however, the electrolyte must be present in sufficient amounts to wet the cathode elements through the electrolyte-permeable barrier. Other forms of high surface area metal may be employed for the anode, such as metal wool or metal chips.

In a typical example, a standard D-size cylindrical cell was constructed as set forth by FIG. 1. The outer cathode element was made of 43 grams of a mixture of $MnO_2$, finely divided graphite, Portland cement, and steel wool. An additional nine grams of the same mixture were used for the central cathode element. The central cathode element was made by pressing the mix around an iron rod which served as the cathode collector for the cell. The anode element was composed of 20 grams of powdered zinc coated with carboxymethyl cellulose, extruded, dried and crushed as set forth in the foregoing discussion. The dry anode material was inserted in the space between the two cathode elements and 16 ml. of 9 N KOH was added to the anode material. Regenerated cellulose was used as the electrolyte-permeable barriers. The cell was then suitably sealed and ready for use.

During performance testing the cell was discharged at a current of 0.5 ampere. The actual performance curve of this cell is shown as the solid line in FIG. 2. For purposes of comparison, a cell composed of the same materials but without the central cathode element was also tested under the same conditions. The performance of this latter cell is indicated by the broken line in FIG. 2. It will be noted that the cell of the present invention provided a substantially greater ampere-hour output at a higher voltage. For example, starting from the same initial voltage of about 1.55 volts, the voltage of the cell of this invention on load decreased to 0.6 volt after a service period of 12 ampere-hours, whereas the cell voltage of the standard cell dropped to 0.6 volt in about 8.3 ampere-hours. Decreased polarization and lower internal resistance in this cell construction resulted in a higher cell voltage. Moreover, a more efficient utilization of anode and cathode materials was observed with the cell of this invention.

The foregoing discussion is intended to be merely illustrative and is not to be interpreted as limiting. It is to be understood that many changes in the details of the construction and the arrangement of parts may be resorted to without departing from the scope and spirit of this invention.

I claim:

1. A sealed galvanic cell which comprises, in combination, a cylindrical casing having an outer annular-shaped cathode element of electrochemically active material in juxtaposition with and contacting the inner wall of said casing, an inner central cathode element of electrochemically active material electrically connected to said outer cathode element and defining an annular space therebetween, an anode element contained in said annular space and separated from said cathode elements by electrolyte-permeable barriers, said anode element consisting essentially of particulate electrochemically active anodic material, said particulate form providing extended anodic material surface area exposed to electrochemical action, an alkaline electrolyte wetting said anode element and wetting said cathode elements through said electrolyte-permeable barriers, at least one of said cathode elements having conductor means serving as a cathode current collector, and conductor means serving as an anode current collector.

2. A cell according to claim 1 wherein said cathode elements comprise manganese dioxide having filamentary conductive fibers dispersed therein and bonded with alkaline-resistant cement.

3. A cell according to claim 1 wherein the anode element comprises zinc particles treated with an aqueous carboxymethyl cellulose solution.

4. A cell according to claim 1 wherein the electrolyte is an aqueous solution of potassium hydroxide.

5. The cell of claim 1 wherein said inner and outer cathode elements are an integrally formed unit.

6. A sealed galvanic cell which comprises, in combination, a cylindrical casing having an outer annular-shaped cathode element of electrochemically active material in juxtaposition with and contacting the inner wall of said casing, an inner central cylindrical cathode element of electrochemically active material spaced from said outer cathode element and defining an annular space therebetween, an anode element contained in said annular space and separated from said cathode elements by electrolyte-permeable barriers, said anode element consisting essentially of particulate electrochemically active anodic material, said particulate form providing extended anodic material surface area exposed to electrochemical action, said central cathode element being electrically connected to said outer cathode element and having a conductor means longitudinally disposed therein to serve as cathode collector, and said anode element having a conductor means longitudinally disposed therein to serve as anode collector.

7. The sealed galvanic cell of claim 6 wherein said inner central cylindrical cathode element is a solid rod provided with a metallic central cathode current collector secured to the bottom of said casing and forming a positive terminal for said cell.

References Cited
UNITED STATES PATENTS

| | | | |
|---|---|---|---|
| 2,610,219 | 9/1952 | Yardney | 136—6.5 |
| 2,993,947 | 7/1961 | Leger | 136—107 |
| 3,113,050 | 12/1963 | Kordesch et al. | 136—123 |
| 3,114,659 | 12/1963 | Warren | 136—6 X |

WINSTON A. DOUGLAS, *Primary Examiner.*

B. OHLENDORF, A. SKAPARS, *Assistant Examiners.*